(12) United States Patent
Islam et al.

(10) Patent No.: US 8,311,594 B2
(45) Date of Patent: *Nov. 13, 2012

(54) WIRELESS DEVICE BATTERY CONSERVATION METHOD AND SYSTEM

(75) Inventors: Muhammad Khaledul Islam, Ottawa (CA); Asif Hossain, San Jose, CA (US)

(73) Assignee: Research In Motion Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/410,672

(22) Filed: Mar. 2, 2012

(65) Prior Publication Data

US 2012/0165080 A1 Jun. 28, 2012

Related U.S. Application Data

(63) Continuation of application No. 12/389,951, filed on Feb. 20, 2009, now Pat. No. 8,131,324, which is a continuation of application No. 11/936,345, filed on Nov. 7, 2007, now Pat. No. 7,512,424, which is a continuation of application No. 10/533,958, filed as application No. PCT/CA03/00309 on Mar. 6, 2003, now Pat. No. 7,313,419.

(60) Provisional application No. 60/423,372, filed on Nov. 4, 2002.

(51) Int. Cl.
*H04B 1/38* (2006.01)
(52) U.S. Cl. .................. 455/574; 455/343.1; 340/539.3; 340/539.13
(58) Field of Classification Search .................. 455/574, 455/343, 1; 340/539.3, 539.12, 539.13
See application file for complete search history.

(56) References Cited

U.S. PATENT DOCUMENTS

| | | | |
|---|---|---|---|
| 5,280,650 | A | 1/1994 | Sobti |
| 5,539,858 | A | 7/1996 | Sasaki et al. |
| 5,754,956 | A | 5/1998 | Abreu et al. |
| 5,794,146 | A | 8/1998 | Sevcik et al. |

(Continued)

FOREIGN PATENT DOCUMENTS

EP 0 9490 441 A2 6/1992

(Continued)

OTHER PUBLICATIONS

English Translation of Chinese Patent Application No. 03825746.7 Office Action Dated Mar. 28, 2008.

(Continued)

*Primary Examiner* — Nghi H Ly
(74) *Attorney, Agent, or Firm* — Mukundan Chakrapani; Borden Ladner Gervais LLP

(57) ABSTRACT

Generally, the present invention provides a method for detecting poor RF conditions, and entering different sleep mode levels or phases in accordance with the RF conditions to save battery power. Mobile device battery life can be conserved when the mobile device detects poor RF conditions and enters a deep sleep mode of operation. In this deep sleep mode of operation the mobile device periodically samples the RF conditions and gradually increases the period between samples when the RF conditions do not improve. Because mobility can change the RF condition for wireless devices even in areas of good RF coverage, the mobile device operating in the deep sleep mode can detect this mobility and thus enhance the probability of entering an idle state, or alternatively, entering a longer power save mode. When the RF condition improves, the mobile device exits from the deep sleep mode and returns to the idle state.

23 Claims, 7 Drawing Sheets

U.S. PATENT DOCUMENTS

| | | |
|---|---|---|
| 6,400,961 B1 | 6/2002 | Lillie et al. |
| 6,411,808 B1 | 6/2002 | Adachi et al. |
| 6,710,578 B1 | 3/2004 | Sklovsky |
| 6,738,640 B1 | 5/2004 | Baker et al. |
| 6,889,041 B2 | 5/2005 | Miyoshi et al. |
| 6,934,516 B2 | 8/2005 | Harada et al. |
| 7,027,831 B2 | 4/2006 | Aoki et al. |
| 7,313,419 B2 * | 12/2007 | Islam et al. ............ 455/574 |
| 7,512,424 B2 * | 3/2009 | Hossain et al. ............ 455/574 |
| 8,131,324 B2 * | 3/2012 | Hossain et al. ............ 455/574 |
| 2002/0106997 A1 | 8/2002 | Barber et al. |

FOREIGN PATENT DOCUMENTS

| | | |
|---|---|---|
| JP | 61-198829 | 9/1986 |
| JP | 63-103523 | 5/1988 |
| JP | 2-266617 | 10/1990 |
| JP | 3-239024 | 10/1991 |
| JP | 4-304043 | 10/1992 |
| JP | 4-334215 | 11/1992 |
| JP | 4-345330 | 12/1992 |
| JP | 4-355524 | 12/1992 |
| JP | 5-030011 | 2/1993 |
| JP | 10-290194 | 10/1998 |

OTHER PUBLICATIONS

English Translation of Japanese Patent Application No. 2004-548954 Office Action Dated Jun. 25, 2008.

U.S. Appl. No. 12/389,951, Notice of Allowance dated Oct. 28, 2011.

International Patent Application No. PCT/CA2003/000309, Search Report dated Jun. 25, 2003.

* cited by examiner

WIRELESS DEVICE BATTERY CONSERVATION METHOD AND SYSTEM

CROSS-REFERENCE TO RELATED APPLICATIONS

This application is a continuation of U.S. patent application Ser. No. 12/389,951, filed Feb. 20, 2009, now U.S. Pat. No. 8,131,324, which is a continuation of U.S. patent application Ser. No. 11/936,345, filed Nov. 7, 2007, now U.S. Pat. No. 7,512,424, which is a continuation of U.S. patent application Ser. No. 10/533,958, filed May 4, 2005, now U.S. Pat. No. 7,313,419, which is a national entry of PCT Application PCT/CA03/000309 filed Mar. 6, 2003, which claims the benefit of U.S. Provisional Patent Application 60/423,372, filed Nov. 4, 2002, the contents of which are hereby incorporated by reference in their entirety.

FIELD OF THE INVENTION

The present invention relates generally to mobile wireless communications devices. More particularly, the present invention relates to a method and system for improving the battery life of wireless communications devices in areas of poor coverage.

BACKGROUND OF THE INVENTION

There are mechanisms in CDMA mobile devices to save battery power while operating within areas having good coverage and areas in which there is no coverage. In areas having good coverage, or areas where relatively strong RF signals are present, mobile device battery power is conserved by entering a sleep mode using the slot cycle index, as described in the CDMA standard, while the mobile device is in an idle state. The slot cycle index is well known to those of skill in the art, and is briefly discussed later. In areas where there is no coverage, the mobile device can enter a deep sleep mode during which it can occasionally 'wake up' to check for a presence of RF signals.

Prior to the discussion of the slot cycle index, a brief description of the acquisition sequence of mobile devices follows. When the mobile device is powered up, it enters a search mode to find a pilot channel. The pilot channel is used to establish an initial communications link with a base station. Then the device switches to a synchronisation channel to obtain setup data such as system and network identification information, timing information and information to find a paging channel, for example. Once the paging channel is acquired, the mobile device can remain in the idle state and subsequently enter an access state for registration with the network, for receiving incoming calls, transmitting outgoing calls, or for sending short message service (SMS) data burst messages. The mobile device can then enter a traffic state for receiving incoming or transmitting outgoing calls, or for sending SMS data burst messages.

The slot cycle index operates in the paging channel of the mobile device, and is shown graphically in FIG. 1. In the slotted mode of operation, the mobile device is set to wake up from a sleep mode at predetermined intervals 20, such as every five seconds for example. The device wakes up for a short window of time 22 to receive any message from a base station, which would only send messages during these short windows of time 22 since it is synchronized with the mobile device. While the mobile device is technically 'on' all the time unless turned off by the user, the mobile device consumes much less battery power during intervals 20 than during wake up periods 22.

In addition to situations where the mobile device is in a good RF coverage area or no RF coverage area, there are situations in which RF conditions are less than ideal and can cause the mobile device to repeatedly lose the paging channel. Geographical location and network/system coverage are examples of situations in which RF conditions can deteriorate. When the paging channel is lost, the mobile device enters a search mode to re-acquire the pilot channel, the synchronisation channel and the paging channel. However, because the newly re-acquired signal can be lost again due to the same conditions under which the original signal was lost, the mobile device continues to repeat this re-acquisition process until either RF conditions improve such that the paging channel is not lost, or the mobile device becomes unusable due to excessive drain of the battery. Thus the periodic nature of the slot cycle index and power saving it provides, cannot be maintained. Therefore the mobile device spends most of its time in an active mode instead of a sleep mode, where it expends valuable battery life as the paging channel is frequently gained and lost. While in such RF conditions where the radio signal is not completely lost for a longer period of time, the mobile device is unable to enter any type of sleep mode to save battery consumption.

It is, therefore, desirable to provide a method for conserving mobile device battery power in situations where RF conditions are poor.

SUMMARY OF THE INVENTION

It is an object of the present invention to obviate or mitigate at least one disadvantage of previous battery power conservation methods. In particular, it is an object of the invention to provide a method of controlling a mobile device operating in poor RF conditions such that battery power is conserved.

In a first aspect, the present invention provides a method for saving battery power in a deep sleep mode of a mobile device. The method includes the steps of waking up from the deep sleep mode after a time interval to sample an RF strength of a system, comparing the sampled RF condition strength to a predetermined level, increasing the time interval if the sampled RF condition strength is less than the predetermined level, and entering the deep sleep mode.

According to the embodiments of the present aspect, the mobile device enters the deep sleep mode when a channel of the system is lost a predetermined number of times within a timeout period, the step of comparing includes comparing the signal to noise ratio of the RF condition to a predetermined value, and the step of comparing includes setting a mobility flag to true if a Pseudo Noise of the system is unknown or if the mobile device is moving. A phase of the Pseudo Noise can be monitored for determining mobility of the mobile device.

In an aspect of the present embodiment, the mobile device returns to one of an idle state and the first level deep sleep mode when the mobility flag is true, and the step of comparing includes incrementing a loop counter when the mobility flag is false, comparing the loop counter value to the maximum loop counter value, and switching the mobile device to one of the second and third level deep sleep modes when the loop counter value equals the maximum loop counter value. The mobile device can switch to the second level deep sleep mode when the mobile device is in the first level deep sleep mode, and can switch to the third level deep sleep mode when the mobile device is in the second level deep sleep mode.

In yet another aspect of the present embodiment, the step of switching includes setting a maximum timeout period to a predetermined timeout value associated with one of the first, second and third level deep sleep modes, and switching the mobile device to one of the second and third level deep sleep modes when the maximum timeout period expires. The mobile device switches to the second level sleep mode when the mobile device is in the first level deep sleep mode, and to the third level deep sleep mode when the mobile device is in the second level deep sleep mode.

In another embodiment of the present aspect, the step of entering the deep sleep mode includes switching the mobile device to one of a first, second and third level deep sleep modes, and the step of switching includes setting a maximum loop counter value to a predetermined counter value associated with one of the first, second and third level deep sleep modes and setting the time interval to a predetermined time value associated with one of the first, second and third level deep sleep modes. The predetermined time value associated with the second level deep sleep mode is greater than the predetermined time value associated with the first level deep sleep mode and the predetermined time value associated with the third level deep sleep mode is greater than the predetermined time value associated with the second level deep sleep mode.

In yet another embodiment of the present aspect, the step of waking includes determining a system for acquisition from a list of systems associated with one of the first, second and third level deep sleep modes. The list of systems can include a first system list, a second system list and a third system list associated with the first, second and third level sleep modes respectively. The first system list can be a subset of the second system list and the third system list, and the second system list can be a subset of the third system list.

In a second aspect, the present invention provides a mobile device battery power saving system. The mobile device battery power saving system includes a channel processor, a deep sleep controller, a variable setting controller, and a low power controller. The channel processor provides a flag signal indicating loss of a system channel. The deep sleep controller receives the flag signal and provides a system lost exit flag. The variable setting controller sets deep sleep mode variables in response to the system lost exit flag and adjusts the deep sleep mode variables in response to control signals. The low power controller iteratively samples an RF condition parameter at a time interval defined by the deep sleep mode variables and provides the control signals to the variable setting controller when the RF condition fails to improve.

According to the embodiments of the present aspect, the system channel includes one of a pilot channel and a paging channel, the deep sleep mode variables include a timer value for setting the time interval and a loop count value for setting a number of iterations, and the RF condition parameter includes a signal to noise strength ratio.

In a third aspect, the present invention provides a method for switching a mobile device to a deep sleep mode. The method includes the steps of monitoring a system channel, counting a number of times the system channel is lost within a timeout period, and entering the deep sleep mode when the system channel count equals a predetermined number.

In an embodiment of the present aspect, the step of monitoring includes monitoring one of a pilot channel and a paging channel of the system channel.

In an alternate embodiment of the present aspect, the step of monitoring includes resetting a channel lost counter and a channel lost start time value, and incrementing the channel lost counter each time the system channel is lost. The step of incrementing includes setting the channel lost start time value to a first current Global Positioning System time when the channel lost counter value is one, and setting a channel lost end time value to a second current Global Positioning System time when the channel lost counter value has reached the predetermined number. The mobile device enters the deep sleep mode when the difference between the channel lost end time value and the channel lost start time value is at least the timeout period, and the channel lost counter and the channel lost start time value are reset after the mobile device enters the deep sleep mode.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

Figure 1:
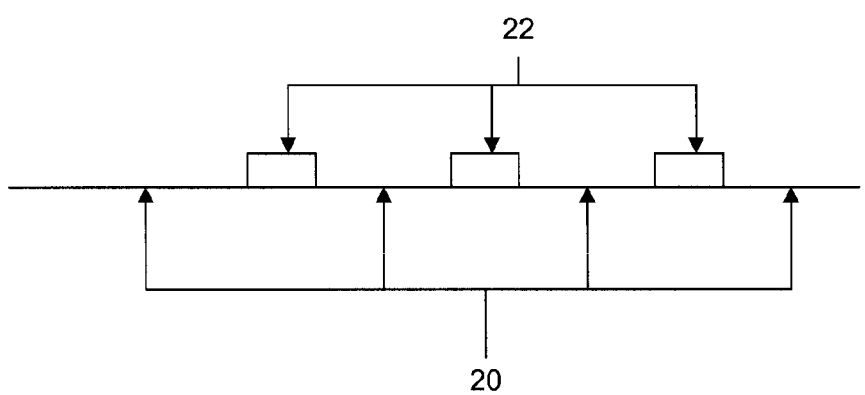
FIG. 1 is a slot cycle index timing diagram of the prior art.

Generally, the present invention provides a method for detecting poor RF conditions, and entering different sleep mode levels or phases in accordance with the RF conditions to save battery power. Mobile device battery life can be conserved when the mobile device detects poor RF conditions and enters a deep sleep mode of operation. In this deep sleep mode of operation the mobile device periodically samples the RF conditions and gradually increases the period between samples when the RF conditions do not improve. Because mobility can change the RF condition for wireless devices even in areas of good RF coverage, the mobile device operating in the deep sleep mode can detect this mobility and thus enhance the probability of entering an idle state, or alternatively, entering a longer power save mode. When the RF condition improves, the mobile device exits from the deep sleep mode and returns to the idle state.

According to a deep sleep mode embodiment of the present invention, the mobile device switches to a deep sleep mode when poor RF conditions are detected, and proceeds to sample the RF condition at a variable time interval. The strength of the RF condition is then compared to a predetermined level. If the strength of the RF condition is less than the predetermined level, the variable time interval is increased. As the variable time interval is progressively increased, the mobile device conserves more battery power. A variety of conditions known to those of skill in the art for entering the deep sleep mode can be used, such as the number of times a system is lost by the mobile device during the idle state, for example. Those of skill in the art will also understand that the variable time interval can be increased after a predetermined number of failed sampling attempts have been made, and that the variable time interval can be increased any number of times and by any amount.

According to a preferred embodiment of the present invention, the mobile device first tries to acquire systems from a Most Recently Used (MRU) Table list which is a part of a Preferred Roaming List (PRL) with a better signal strength (RSSI & Ec/Io) than the signal that was initially lost. It is understood to those of skill in the art that the mobile device tunes to the known frequency of the system and searches for a CDMA signal in order to acquire the system. If successful, the mobile device goes into the idle state in that system. Otherwise, the mobile device goes into a first level deep sleep mode immediately. While in the first level deep sleep mode, the mobile device periodically wakes up to sample the RF condition. If the RF condition is acceptable, then the mobile device re-acquires a signal and enters the idle state. If the poor RF condition persists, then the mobile device enters a second level deep sleep mode, followed by a third level deep sleep mode. The mobile device executes the same functions as in the first level sleep mode while in the second and third level sleep modes, except that the variable time interval between samples increases with each sleep mode level and different systems are attempted for acquisition. More specifically, the mobile device will attempt to acquire a system from the MRU Table list in the first level, then it will attempt to acquire a system in the MRU Table list as well as systems in the current Geographical Region (Idle GEO List) from the PRL, and then it will attempt to acquire a system from all the systems in the PRL.

Figure 2:
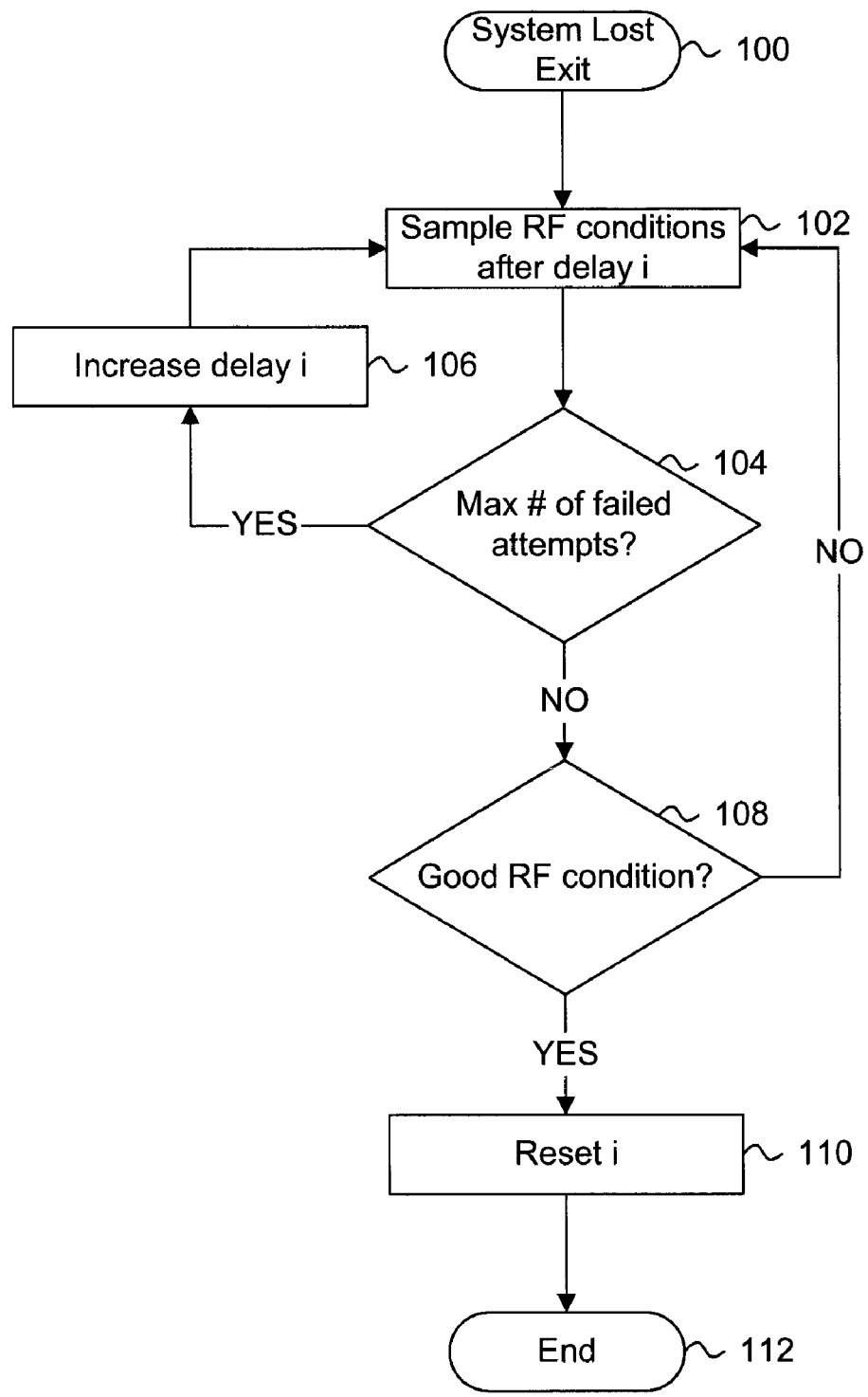
FIG. 2 is a flow chart showing a mobile device control method according to an embodiment of the present invention.

FIG. 2 illustrates the deep sleep mode process described in the previous paragraph, and in particular shows the general method for saving mobile device battery power in a situation where poor RF conditions result in a loss of the system or paging channel. When the paging channel is lost, the mobile device initiates a system lost exit from the main routine in which the mobile device was trying to operate in an idle mode. From FIG. 2, the process begins at step 100 where it is assumed that the mobile device has entered a deep sleep mode of operation. In step 102 the mobile device briefly activates, or wakes up, from the deep sleep mode to sample the RF condition after a delay time i has passed since entering the deep sleep mode in step 100. A counter is used to keep track of the number of sampling iterations, and at step 104, the number of sampling iterations is compared to a preset maximum number of iterations. If the counter is less than the maximum number, the process will proceed to step 108. At step 108, the condition of the sampled RF condition is determined. If the RF condition is poor, then the process proceeds back to step 102 for another sample and the counter is incremented. The loop of steps 102, 104 and 108 continues until the counter value equals the maximum number of iterations. When the counter reaches the maximum value, the process proceeds to step 106 to increase the delay time i by a predetermined value. The counter is then reset and the loop of steps 102, 104 and 108 continues again for either the same or a different maximum number of iterations. If the sampled RF condition is determined to be good at step 108, the process proceeds to step 110 to reset the delay time i and then to step 112 where the deep sleep mode of operation is ended. Delay time i is preferably increased up to three times, but can also be increased any desired number of times.

The purpose of changing the delay time i is to capture the mobility status of the mobile device. In the embodiment shown in FIG. 2, the initial delay time i corresponds to the first level deep sleep mode, the first increase in the delay time i corresponds to the second level deep sleep mode, and the second increase in the delay time i corresponds to the third level deep sleep mode. A higher frequency of RF condition sampling, when delay time i is short, is intended to capture the situation where RF conditions are changing rapidly. For example, the mobile device can be in a moving vehicle, or in a parking lot where moving vehicles can change the RF condition. A lower frequency of RF condition sampling, when delay time i is increased, is intended to capture the situation where the RF conditions are changing slowly. For example, when a walking user carries the mobile device. A low frequency of RF condition sampling, when delay time i is high, is intended to capture the situation where the RF conditions are changing very slowly or not at all. For example, when the mobile device is stationary in an area with poor RF conditions. Therefore, by gradually stepping down the sampling frequency, the battery power of the mobile device can be conserved. Furthermore, this decreasing sequence diligently attempts to attain the system as soon as possible for the mobile device. Specifically, if the mobile device is moving, there is a higher probability of encountering improved RF conditions or detection of an area with no RF signal over a short period of time. If the mobile device is stationary, the probability of having the same poor RF condition over a longer period of time is higher. Naturally, the specific delay times for i can be selected to be any value in seconds or minutes.

The following embodiments of the present invention describe a system and method which is suitable for use in a mobile device for saving battery power in poor RF conditions.

Figure 3:
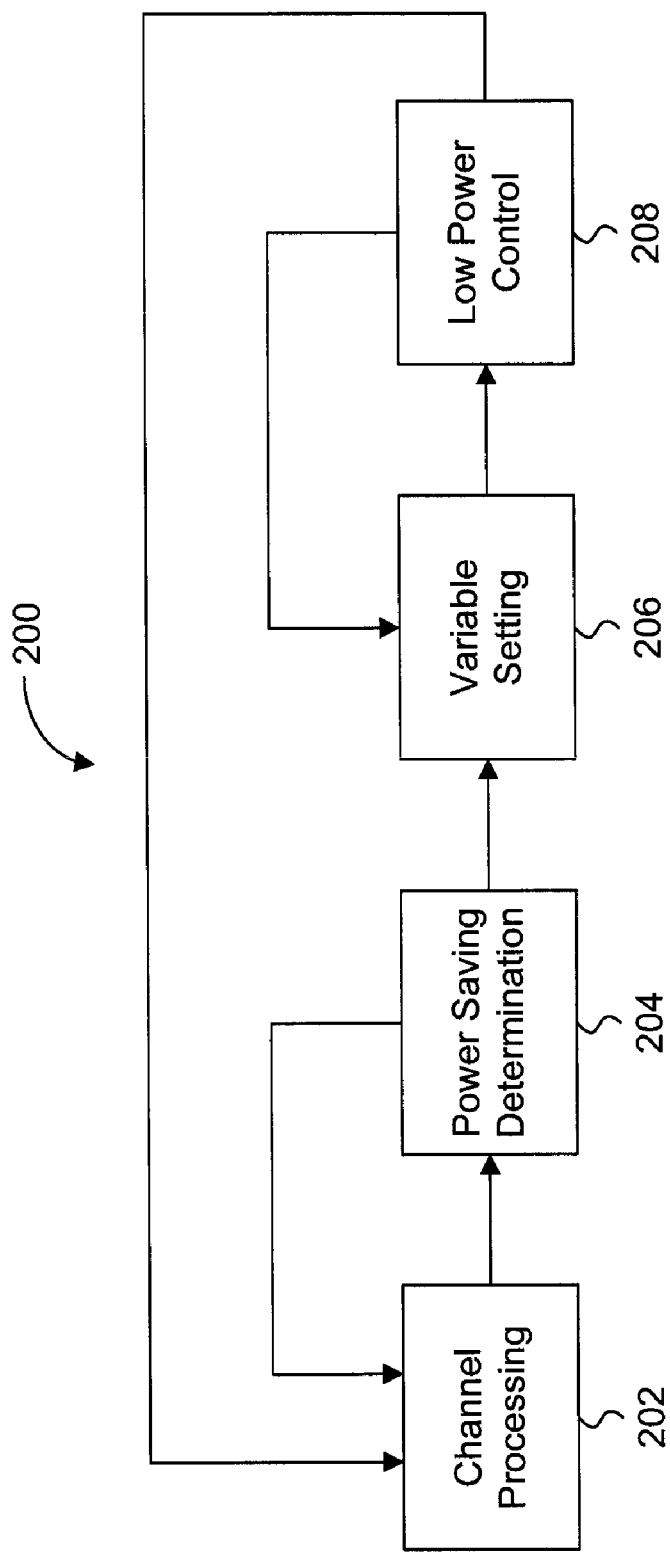
FIG. 3 is a block diagram of a mobile device control system according to another embodiment of the present invention.

FIG. 3 shows a block diagram of a deep sleep system according to an embodiment of the present invention. The deep sleep system 200 shown in FIG. 3 monitors communication channels, enables successful communication and controls the mobile device in the deep sleep mode. Deep sleep system 200 includes a channel processor 202, a deep sleep controller 204, a variable setting controller 206 and a low power controller 208. The arrows interconnecting the blocks either feed-forward information from one block to another, or feed-back information to other blocks. The functions of each block can be implemented within an application specific integrated circuit (ASIC) with the other mobile device functions. The general function of each block is now described.

Channel processor 202 executes the standard channel acquisition functions for operating the mobile device in the slotted mode of operation. The deep sleep controller 204 receives a flag signal indicating a loss of the pilot or paging channel by the channel processor 202, and initiates a system lost exit based upon preset conditions. In this particular embodiment, deep sleep controller 204 counts the number of times the pilot or paging channel is lost over a period of time. The channel processor 202 is instructed to continue searching for a system if the preset conditions are not met, but initiates a system lost exit if the preset conditions are met. Once a system lost exit is initiated by the deep sleep controller 204, the variable setting controller 206 sets the appropriate deep sleep mode variables for each of the first, second and third level deep sleep modes. The low power controller 208 samples the RF condition in accordance with the deep sleep mode variables set by the variable setting controller 206, and switches the mobile device to the second and third level deep sleep modes by sending control signals to the variable setting controller 206. In the presence of a good RF condition, the low power controller 208 returns control of the mobile device to the channel processor 202 for normal operation.

The control processes for each of the aforementioned blocks is now described with reference to FIGS. 4 to 7.

Figure 4:
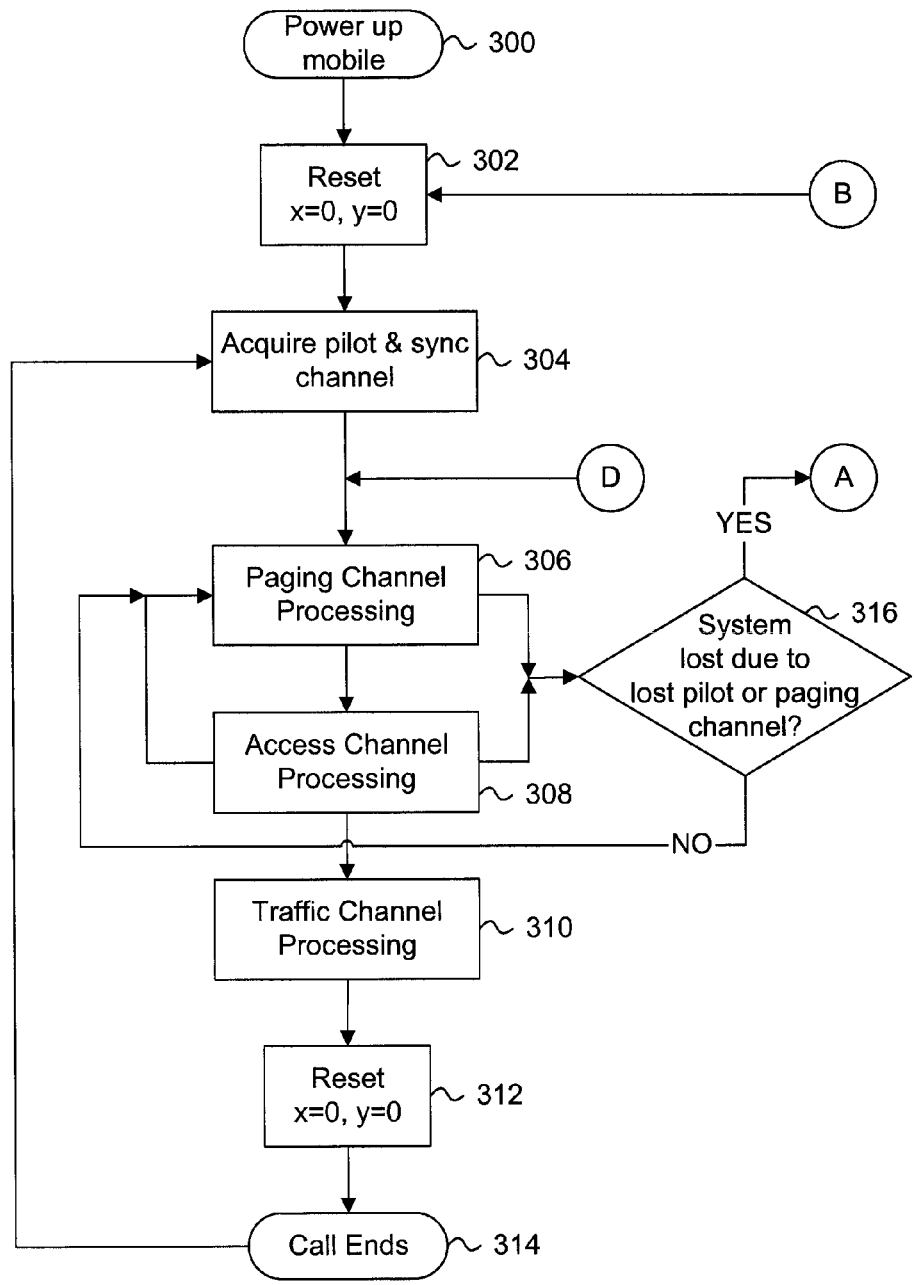
FIG. 4 is a flow chart showing a process of the channel processor of FIG. 3.

FIG. 4 shows the control process for channel processor 202 of system 200 in FIG. 3. The present control process performs the standard functions associated with the slotted mode of operation, such as acquisition of communication channels and handling of data traffic between the mobile device and a base station. The present control process interacts with the other blocks of the system to permit the mobile device to re-enter a normal mode of operation, such as the idle state for example. At step 300, the mobile device is powered up or the radio circuits are turned on. A channel lost counter x and a channel lost start time y are initialized or reset to a null value in step 302. In step 304 the mobile device enters a system determination phase where it attempts to acquire a pilot channel and a synchronisation channel of a system. Once the pilot channel and synchronisation channel are acquired, paging channel processing proceeds in step 306 where the mobile device enters an idle state and operates in either slotted or non-slotted modes while monitoring the pilot and paging channels. The mobile device will switch to the access channel in step 308 while monitoring the pilot channel and may go back to monitoring the paging channel if the reason for access was not to go into the traffic state. One example of a reason for access is to register with the network. The process proceeds to step 310 and switches to the traffic channel when an outgoing call is made or an incoming call is received. Then the channel lost counter and channel lost start time are both reset at step 312, and the call is completed at step 314. Variables x and y are always reset at step 312 if a successful call is completed. After the call ends, the process loops back to step 304. It is noted that the system can be lost during steps 306 and 308, resulting in the process proceeding to step 316 for determination of the reason for the system loss. Other reasons the system can be lost include access failures or redirection of the mobile device by the base station to search for other systems. If the system is lost due to loss of the pilot or paging channel, then the process proceeds to intermediate step "A", otherwise the process returns to step 304.

Figure 5:
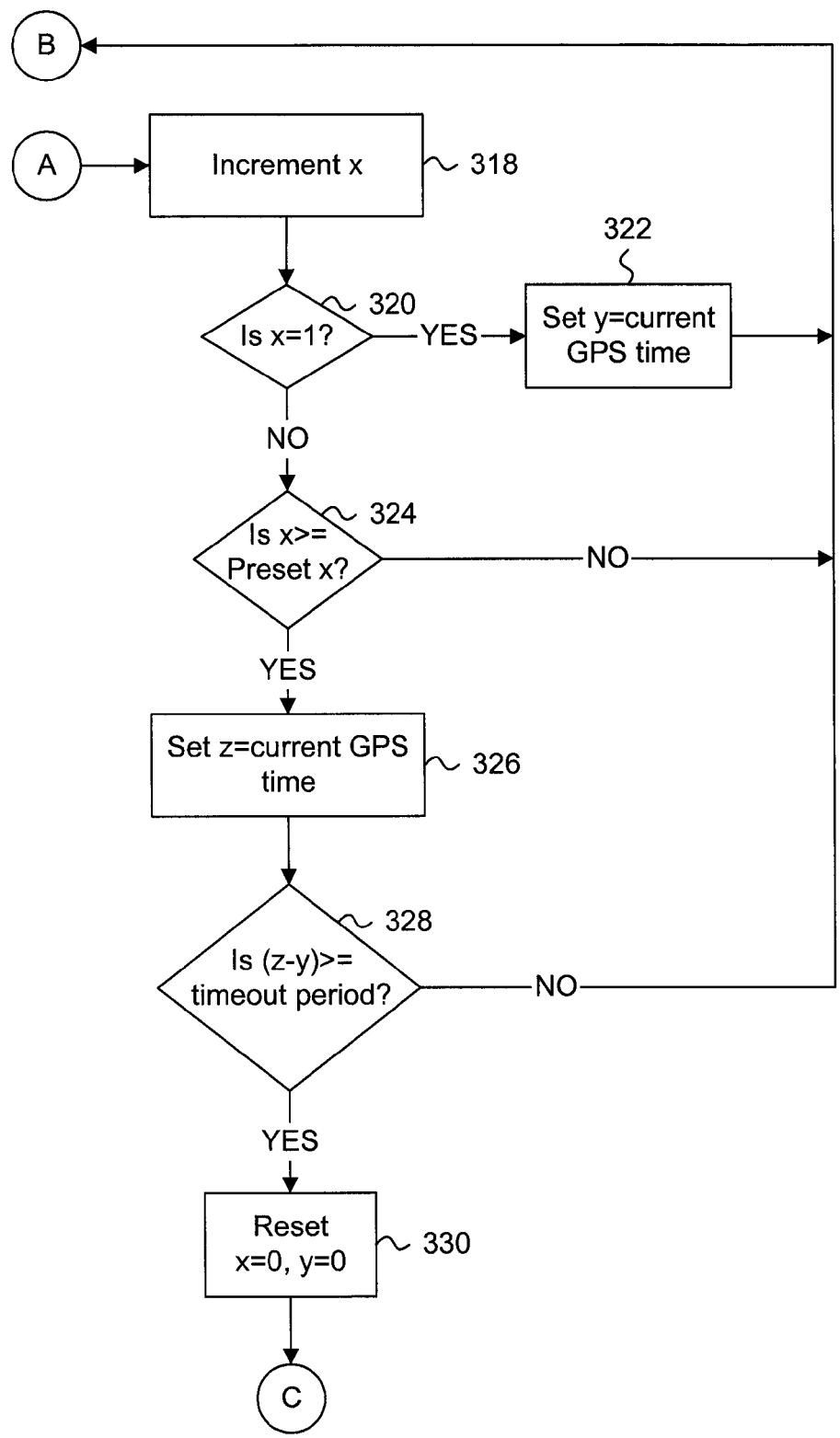
FIG. 5 is a flow chart showing a process of the power saving controller of FIG. 3.

FIG. 5 shows the control process for the deep sleep controller 204 of FIG. 3, which is executed when the system is lost due to loss of the pilot or paging channel from the control process of FIG. 4. From intermediate step "A", channel lost counter x is incremented in step 318, and a determination is made in step 320 to check if x is exactly one. If true, the channel lost start time y is set to the current Global Positioning System (GPS) time in step 322 and the process returns to step 304 of FIG. 4 via intermediate step "B". Steps 320 and 322 capture the situation where the pilot and paging channel are lost for the first time. If x is greater than one in step 320, then the process enters step 324 which checks if x is at least equal to a preset value. If not, then the process returns to step 304 of FIG. 4 via intermediate step "B". Otherwise, the process proceeds to step 326 where the channel lost end time, recorded via variable z, is set to the current GPS time. The preset value establishes one condition for entering the deep sleep mode, which is a minimum number of times the pilot or paging channel is lost by the mobile device. At step 328, the difference between variables z and y is compared to a preset timeout period. If this difference is at least equal to the preset timeout period, then x and y are reset in step 330 and the process proceeds to intermediate step "C". Otherwise, the process returns to step 302 of FIG. 4 via intermediate step "B" indicating that the number of times the mobile device performed a system lost exit did not happen during the predefined timeout period. Thus the deep sleep controller decides that the RF condition is not so poor as to warrant entering the deep sleep mode of operation. The timeout period establishes a second condition for entering the deep sleep mode in combination with the first condition. In otherwords, the deep sleep mode is entered only when the pilot or paging channel is lost at least a minimum number of times within a maximum period of time.

Figure 6:
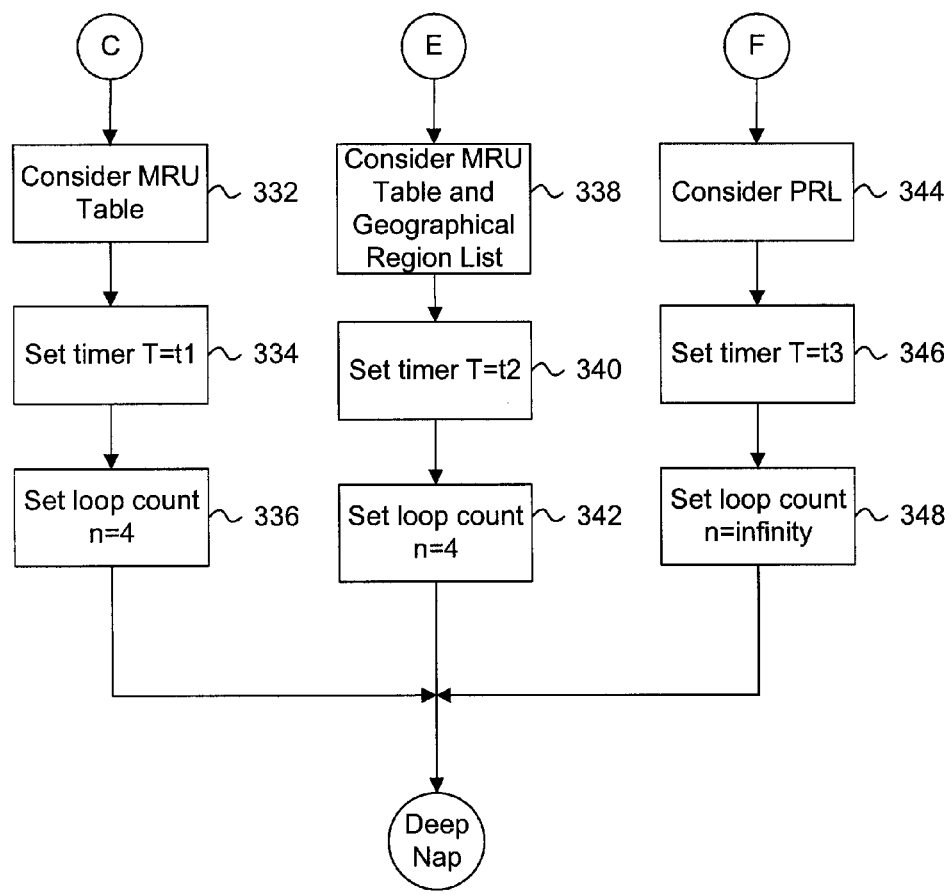
FIG. 6 is a flow chart showing a process of the variable setting controller of FIG. 3; and, FIG. 7 is a flow chart showing a process of the low power controller of FIG. 3.

FIG. 6 shows the control process for the variable setting controller 206 of FIG. 3. This control process is initially entered via intermediate step "C". As will be discussed later, the control process of FIG. 6 is re-entered later via intermediate steps "D" and "E". From intermediate step "C", a most recently used (MRU) table listing the systems to be attempted for acquisition in the deep sleep mode is looked up in step 332. In the present embodiment, the mobile device stores the last ten to twelve systems it last acquired in its MRU table. A variable timer T is then set to a first value t1 in step 334, and a variable maximum loop counter value n is preferably set to four in step 336. The process then enters a deep nap process through intermediate step "Deep Nap". Steps 332 to 336 establish the variables for the first level sleep mode. From intermediate step "E", the systems from the MRU and current Geographical Region of the mobile device are looked up for acquisition attempts in step 338. The variable timer T is then set to a second value t2 in step 340, and the variable maximum loop counter value n is preferably set to four in step 342. From intermediate step "F", all the systems from the PRL are looked up for acquisition attempts in step 344. The variable timer T is then set to a third value t3 in step 346, and the variable maximum loop counter value n is preferably set to infinity in step 348. This is practically achieved by setting n to the highest allowable integer number, or by implementing an endless loop. Although steps 338 to 342 and 344 to 348 are generally the same as steps 332 to 336 respectively, steps 338 to 342 establish the variables for the second level sleep mode, and steps 344 to 348 establish the variables for the third level sleep mode. Specifically, variable timer T is set to time t2 in step 340 which is preferably greater than t1, and variable timer T is set to time t3 in step 346 which is preferably greater than t2. The maximum loop counter value n is preferably set to four in step 342 and then infinity in step 348.

Figure 7:
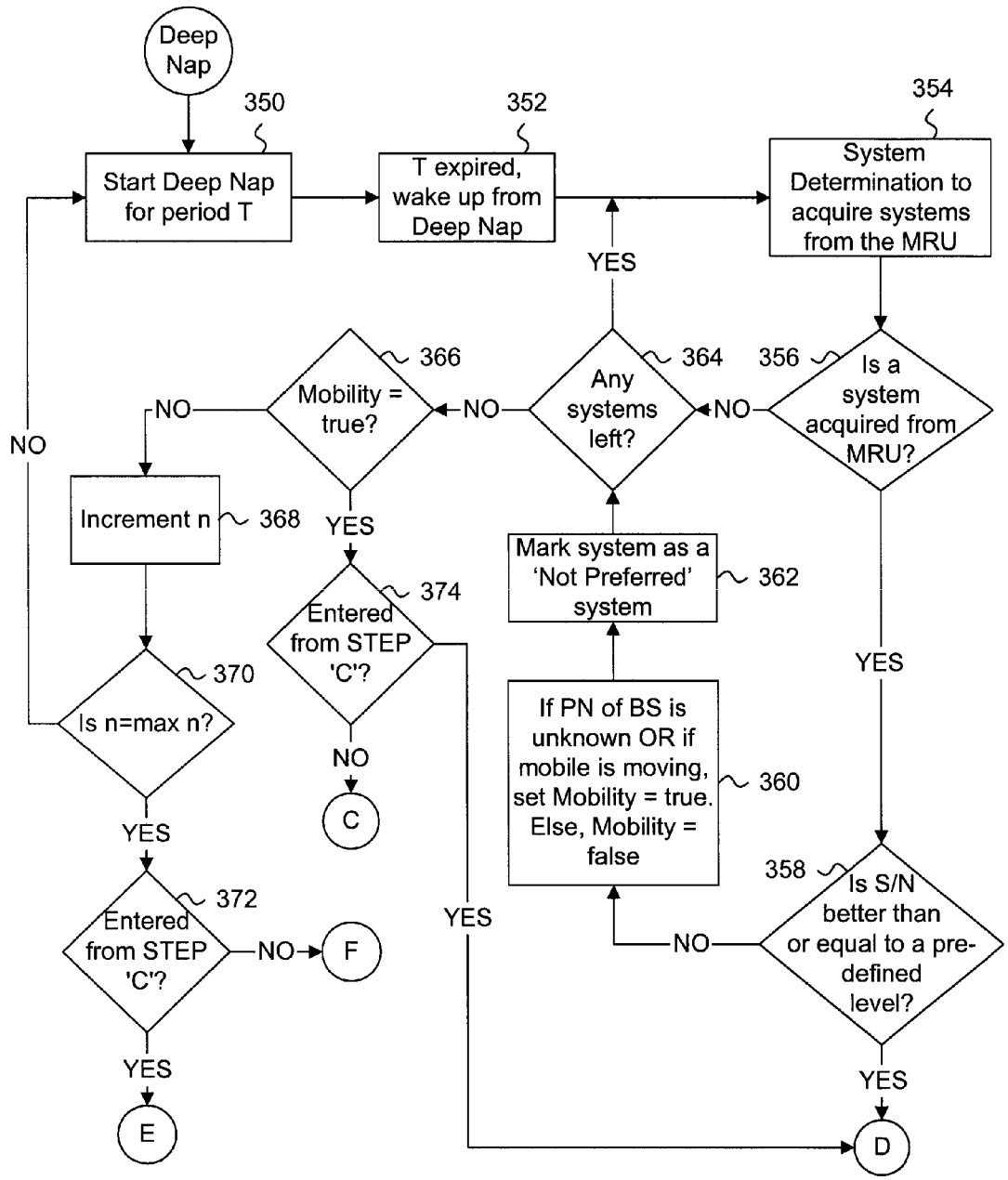

FIG. 7 shows the control process for the low power controller 208 of FIG. 3, which is executed after the variable time T and maximum loop counter value n are set in FIG. 6. In step 350, the mobile device goes to deep sleep for the time T for conserving power. When the time T expires, the mobile device wakes up in step 352 and proceeds to step 354. In step 354, the mobile device enters a system determination phase and attempts to acquire systems sequentially as determined by the list of systems described in FIG. 6. If a system is acquired in step 356, the signal to noise ratio (S/N) is assessed in step 358. Otherwise, the process proceeds to step 364. In step 358, the S/N of the acquired system is compared to a predefined level. If the S/N strength is at least equal to the predefined level, then the process returns to step 306 of FIG. 4 via intermediate step "D" where the mobile device exits from the deep sleep mode. If the S/N strength is below the predefined level, the process proceeds to step 360 where a mobility flag is either set to true or false. Either of two conditions are used to set the mobility flag to true. First, if the Pseudo Noise (PN) of the acquired system base station is unknown to the mobile device, then the mobility flag is set to true. Second, if the PN phase indicates that the mobile is moving, then the mobility flag is set to true. In CDMA systems, each base station can be identified by its unique PN sequence. The process then proceeds to step 362 to mark the current system as 'Not Preferred' because the Signal to Noise Ratio is not satisfactory. Therefore, the mobile device will not re-attempt acquisition of systems that are marked as "Not Preferred" while it is operating within the process of FIG. 7.

In step 364, the process checks for any systems from the lists in FIG. 6 where an acquisition attempt has not been made. If step 364 is entered from step 362, then the result is automatically 'no' and the process proceeds to step 366. This allows the mobile device to try the other systems in the list and find systems with a satisfactory S/N ratio. If step 364 is entered from step 356 and there are systems remaining for acquisition attempt, then the process loops back to step 354 for acquisition of the next system in the list from FIG. 6. In step 366 the mobility flag is checked, and if false, a loop counter is incremented in step 368. Otherwise, the process proceeds to step 374 where the mobile device prepares to exit from the control process of FIG. 7. If step 350 was initially entered via intermediate step "C" from FIG. 6, then the process returns to step 306 via intermediate step "D". Otherwise, the process returns to step "C" of FIG. 6. Step 374 allows the mobile device to exit the current control process. More specifically, the mobile device either returns to a normal operating mode or the first level deep sleep mode if step 350 was entered from either intermediate step "E" or "F" from FIG. 6. Hence the mobile device can have a higher probability of returning to the idle state in situations where the RF condition begins to improve and change rapidly. After the loop counter is incremented in step 368, it is compared to the maximum loop counter value in step 370. If the loop counter has not reached the maximum loop counter value, then the process loops back to step 350 to start another iteration of the present control process. On the other hand, if the maximum loop counter value is reached, then the process proceeds to step 372. In step 372 the process determines which deep sleep mode level the mobile device is currently in. If the mobile device is currently in the first level deep sleep mode as set by steps 332 to 336, then the process will enter the second level deep sleep mode via intermediate step "E" and steps 338 to 342 of FIG. 6. If the mobile device is currently in the second level deep sleep mode, the process will enter the third level deep sleep mode via intermediate step "F" and steps 344 to 348 of FIG. 6. If the mobile device is already in the third level deep sleep mode, then it will remain in the third level deep sleep mode since the process will loop back to steps 344 to 348 via intermediate step "F". Therefore, the control process of FIG. 7 loops for a predetermined number of times in each deep sleep mode level based upon the maximum loop counter value n set in the variable setting controller 206 of FIG. 3, where a system S/N strength is sampled in each loop. Furthermore, because time T is also set in the variable setting controller 206, each loop is executed only after time T expires. As the RF condition fails to improve, the control process of FIG. 7 will progressively enter different deep sleep mode levels where the mobile device wakes up less and less periodically to sample the system. Hence battery life is conserved under poor RF conditions.

In a preferred embodiment, the control process of FIG. 7 uses a timeout period to determine when the control process should enter the next sleep mode level, instead of using a loop counter. The timeout period can be variably set for each sleep mode level in the same way the loop counter is set in FIG. 6.

In another preferred embodiment, the value t1 can be 30 seconds, the value for t2 can be 1 minute and the value for t3 can be 3 minutes.

The deep sleep mode embodiments of the present invention capture the mobility status of the mobile device. The faster the mobile device is moving, the higher the probability that it enters a better coverage area with improved RF conditions so that the user can send/receive calls. When coverage is persistently poor, the mobile device can enter a deep sleep mode where the circuits remain powered down for several minutes at a time.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A mobile device battery power saving system comprising:
   a channel processor
      to monitor a system channel and to provide a flag signal indicating a loss of the system channel;
   a deep sleep controller
      to determine a number of times the system channel is lost within a timeout period based on the flag signal and,
      to initiate, when the number of times the system channel is lost exceeds a preset number within the timeout period, a system lost exit by entering a deep sleep mode level of a deep sleep mode, the deep sleep mode having first, second, and third deep sleep mode levels, each of the deep sleep mode levels having associated therewith a respective system acquisition list and a respective sleep time interval;
   a variable setting controller
      to set the respective sleep time interval associated with the current deep sleep mode level; and
   a low power controller
      to iteratively sample, after an elapse of the respective sleep time interval, RF signal strength of systems in the respective system acquisition list associated with the current deep sleep mode level, and
      if the sampled RF signal strength of the systems in the respective system acquisition list associated with the current deep sleep mode level is less than a preset level, causes the mobile device to re-enter the deep sleep mode at a subsequent deep sleep mode level.

2. The mobile device battery power saving system of claim 1, wherein to sample the RF signal strength includes comparing the signal to noise ratio of the RF signal to a predetermined value.

3. The mobile device battery power saving system of claim 1, wherein to re-enter the deep sleep mode at the subsequent deep sleep mode level includes switching the mobile device to the second deep sleep mode level when the mobile device is in the first deep sleep mode level.

4. The mobile device battery power saving system of claim 1, wherein to re-enter the deep sleep mode at the subsequent deep sleep mode level includes switching the mobile device to the third deep sleep mode level when the mobile device is in the second deep sleep mode level.

5. The mobile device battery power saving system of claim 1, wherein the a variable setting controller sets a maximum timeout period to a preset timeout value associated with one of the first, second and third level deep sleep modes.

6. The mobile device battery power saving system of claim 5, wherein the deep sleep controller switches the mobile device to one of the second and third deep sleep mode levels when the maximum timeout period expires.

7. The mobile device battery power saving system of claim 1, wherein the system acquisition list associated with the first deep sleep mode level is a subset of the system acquisition list associated with the second deep sleep mode level and the system acquisition list associated with the third deer sleep mode level, and the system acquisition list associated with the second deep sleep mode level is a subset of the system acquisition list associated with the third deep sleep mode level.

8. The mobile device battery power saving system of claim 7, wherein the system acquisition list associated with the first deep sleep mode level is a Most Recently Used (MRU) Table list.

9. The mobile device battery power saving system of claim 7, wherein the system acquisition list associated with the second deep sleep mode level is a Most Recently Used (MRU) Table list and a Geographical Region (Idle GEO) list.

10. The mobile device battery power saving system of claim 7, wherein the system acquisition list associated with the third deep sleep mode level is a Most Recently Used (MRU) Table list, a Geographical Region (Idle GEO) list and a Preferred Roaming List (PRL).

11. The mobile device battery power saving system of claim 1, wherein the variable setting controller sets a maximum loop counter value to a preset counter value associated with one of the first, second and third deep sleep mode levels.

12. The mobile device battery power saving system of claim 11, wherein the low power controller sets a mobility flag to true if the mobile device is moving.

13. The mobile device battery power saving system of claim 11, wherein the variable setting controller sets the sleep time interval to a preset time value associated with one of the first, second and third deep sleep mode levels.

14. The mobile device battery power saving system of claim 13, wherein the preset time value associated with the second deep sleep mode level is greater than the preset time value associated with the first deep sleep mode level.

15. The mobile device battery power saving system of claim 13, wherein the preset time value associated with the third deep sleep mode level is greater than the preset time value associated with the second deep sleep mode level.

16. The mobile device battery power saving system of claim 11, the low power controller sets a mobility flag to true if a Pseudo Noise of the system is unknown.

17. The mobile device battery power saving system of claim 16, wherein a phase of the Pseudo Noise is monitored for determining mobility of the mobile device.

18. The mobile device battery power saving system of claim 16, wherein the mobile device returns to one of an idle state and the first deep sleep mode level when the mobility flag is true.

19. The mobile device battery power saving system of claim 18, wherein the variable setting controller
   increments a loop counter when the mobility flag is false;
   compares the loop counter value to the maximum loop counter value; and,
   causes the mobile device to switch to one of the second and third deep sleep mode levels when the loop counter value equals the maximum loop counter value.

20. A mobile communication device comprising:
a mobile device battery power saving system having
   a) a channel processor for providing a flag signal indicating loss of a system channel;
   b) a deep sleep controller for receiving the flag signal, counting a number of times the system channel is lost within a timeout period, and providing a system lost exit flag for entering a deep sleep mode level of the deep sleep mode, the deep sleep mode having first, second, and third deep sleep mode levels, each of the deep sleep mode levels having associated therewith a respective system acquisition list and a respective sleep time interval, when the system channel count equals a predetermined number;
   c) a variable setting controller for setting deep sleep mode level variables in response to the system lost exit flag and for adjusting the deep sleep mode variables in response to control signals; and,
   d) a low power controller for iteratively sampling an RF condition parameter at a time interval defined by the deep sleep mode variables and for providing the control signals to the variable setting controller when the RF condition fails to improve.

21. The mobile communication device of claim 20, wherein the system channel includes one of a pilot channel and a paging channel.

22. The mobile communication device of claim 21, wherein the deep sleep mode level variables include a timer value for setting the time interval and a loop count value for setting a number of iterations.

23. The mobile communication device of claim 22, wherein the RF condition parameter includes a signal to noise strength ratio.

* * * * *